(12) United States Patent
Kamen et al.

(10) Patent No.: US 6,705,081 B2
(45) Date of Patent: Mar. 16, 2004

(54) SYSTEM AND METHOD FOR SENSOR CONTROL OF THE FUEL-AIR RATIO IN A BURNER

(75) Inventors: Dean L. Kamen, Bedford; Christopher C. Langenfeld, Nashua; Michael Norris, Manchester; William W. Ormerod, III, Hookset, all of NH (US); Andrew Schnellinger, North Andover, MA (US)

(73) Assignee: New Power Concepts LLC, Manchester, NH (US)

( * ) Notice: Subject to any disclaimer, the term of this patent is extended or adjusted under 35 U.S.C. 154(b) by 0 days.

(21) Appl. No.: 09/853,239

(22) Filed: May 11, 2001

(65) Prior Publication Data

US 2001/0032452 A1 Oct. 25, 2001

Related U.S. Application Data

(63) Continuation-in-part of application No. 09/517,686, filed on Mar. 2, 2000, now Pat. No. 6,247,310, which is a continuation-in-part of application No. 09/115,383, filed on Jul. 14, 1998, now Pat. No. 6,062,023.
(60) Provisional application No. 60/052,535, filed on Jul. 15, 1997.

(51) Int. Cl.[7] .............................................. F01B 29/10
(52) U.S. Cl. ............................ 60/521; 60/522; 60/524; 60/39.6
(58) Field of Search ...................... 60/39.6, 517, 521, 60/522, 524

(56) References Cited

U.S. PATENT DOCUMENTS

| | | | |
|---|---|---|---|
| 3,775,973 A | 12/1973 | Hudson | 60/39.25 |
| 3,860,384 A * | 1/1975 | Vulliet et al. | 43/14 |
| 4,008,039 A * | 2/1977 | Compton et al. | 431/90 |
| 4,067,191 A | 1/1978 | Grönvall et al. | 60/39.27 |
| 4,085,588 A | 4/1978 | Reams et al. | 60/517 |
| 4,231,222 A | 11/1980 | Fenton | 60/524 |
| 4,330,260 A | 5/1982 | Jorgensen et al. | |
| 4,364,724 A | 12/1982 | Alpkvist | |
| 4,633,667 A | 1/1987 | Watanabe et al. | 60/517 |
| 4,768,341 A | 9/1988 | Nozaki et al. | 60/524 |
| 4,881,372 A | 11/1989 | Naito | 60/521 |
| 4,977,742 A | 12/1990 | Meijer | 60/525 |
| 5,005,349 A | 4/1991 | Momose et al. | 60/517 |
| 5,065,579 A | 11/1991 | Monahan | 60/524 |
| 5,590,626 A | 1/1997 | Hitomi et al. | 123/90.15 |
| 5,735,681 A | 4/1998 | Cheng | 431/10 |
| 5,921,764 A | 7/1999 | Marchionna et al. | 431/9 |
| 5,954,039 A | 9/1999 | Doering et al. | 123/692 |
| 6,062,023 A * | 5/2000 | Kerwin et al. | 60/520 |
| 6,247,310 B1 * | 6/2001 | Norris et al. | 60/521 |

FOREIGN PATENT DOCUMENTS

| | | |
|---|---|---|
| DE | 198 20 192 A1 | 11/1998 |
| FR | 2 609 154 | 7/1988 |
| JP | 61 128014 | 10/1986 |
| JP | 02 021123 | 1/1990 |
| JP | 02 256856 | 10/1990 |
| JP | 03009058 | 1/1991 |
| JP | 04 347410 | 4/1993 |
| JP | 09 015197 | 1/1997 |

* cited by examiner

Primary Examiner—Hoang Nguyen
(74) Attorney, Agent, or Firm—Bromberg & Sunstein LLP

(57) ABSTRACT

A method for controlling the fuel-air ratio of a burner having a blower responsive to a blower drive signal for injecting air into the burner. The method is based at least on the concentration of a gas in an exhaust gas product of a combustion chamber of the burner and includes measuring the gas concentration in the exhaust gas product, deriving a gas concentration signal from the measured gas concentration, determining the fuel-air ratio from the gas concentration signal and the sign of the derivative of the gas concentration signal with respect to the blower drive signal, and controlling the fuel-air ratio by adjusting the air flow rate into the burner. The burner may be, for example, in a Stirling cycle engine.

30 Claims, 13 Drawing Sheets

SECTION A-A

SYSTEM AND METHOD FOR SENSOR CONTROL OF THE FUEL-AIR RATIO IN A BURNER

PRIORITY

The present application is a continuation-in-part of U.S. patent application Ser. No. 09/517,686, filed Mar. 2, 2000, now U.S. Pat. No. 6,247,310, itself a continuation-in-part application of U.S. patent application Ser. No. 09/115,383, filed Jul. 14, 1998, and issued May 16, 2000 as U.S. Pat. No. 6,062,023, claiming priority from U.S. provisional application number 60/052,535, filed Jul. 15, 1997, all of which applications are herein incorporated by reference.

TECHNICAL FIELD

The present invention pertains to improvements to a burner as for a Stirling cycle heat engine and more particularly to improvements relating to control of the fuel and air input provided to the burner.

BACKGROUND OF THE INVENTION

Stirling cycle machines, including engines and refrigerators, have a long technological heritage, described in detail in Walker, *Stirling Engines*, Oxford University Press (1980), incorporated herein by reference. The principle underlying the Stirling cycle engine is the mechanical realization of the Stirling thermodynamic cycle: isovolumetric heating of a gas within a cylinder, isothermal expansion of the gas (during which work is performed by driving a piston), isovolumetric cooling, and isothermal compression. In an ideal Stirling thermodynamic cycle, the working fluid undergoes successive cycles of isovolumetric heating, isothermal expansion, isovolumetric cooling and isothermal compression. Practical realizations of the cycle, wherein the stages are neither isovolumetric nor isothermal, are within the scope of the present invention and may be referred to within the present description in the language of the ideal case without limitation of the scope of the invention as claimed.

Additional aspects of Stirling cycle machines and improvements thereto are discussed in a co-pending U.S. patent application Ser. No. 09/517,245, filed Mar. 2, 2000, and incorporated herein by reference.

The principle of operation of a Stirling cycle engine is readily described with reference to FIGS. 1a-1f, wherein identical numerals are used to identify the same or similar parts. Many mechanical layouts of Stirling cycle engines are known in the art, and the particular Stirling engine designated generally by numeral 10 is shown merely for illustrative purposes. In FIGS. 1a to 1d, a piston 12 (otherwise referred to herein as a "compression piston") and a second piston (also known as an "expansion piston") 14 move in phased reciprocating motion within cylinder 16. Compression piston 12 and expansion piston 14 may also move within separate, interconnected, cylinders. Piston seals 18 prevent the flow of a working fluid contained within cylinder 16 between piston 12 and piston 14 from escaping around either piston 12. The working fluid is chosen for its thermodynamic properties, as discussed in the description below, and is typically helium at a pressure of several atmospheres. The volume of fluid governed by the position of expansion piston 14 is referred to as expansion space 22. The volume of fluid governed by the position of compression piston 12 is referred to as compression space 24. In order for fluid to flow between expansion space 22 and compression space 24, whether in the configuration shown or in another configuration of Stirling engine 10, the fluid passes through regenerator 26. Regenerator 26 is a matrix of material having a large ratio of surface area to volume which serves to absorb heat from the working fluid when the fluid enters hot from expansion space 22 and to heat the fluid when it passes from compression space 24 returning to expansion space 22.

During the first phase of the engine cycle, the starting condition of which is depicted in FIG. 1a, piston 12 compresses the fluid in compression space 24. The compression occurs at a constant temperature because heat is extracted from the fluid to the ambient environment. In practice, a cooler 68 (shown in FIG. 2) is provided, as will be discussed in the description below.

The condition of engine 10 after compression is depicted in FIG. 1b. During the second phase of the cycle, expansion piston 14 moves in synchrony with compression piston 12 to maintain a constant volume of fluid. As the fluid is transferred to expansion space 22, it flows through regenerator 26 and acquires heat from regenerator 26 such that the pressure of the fluid increases. At the end of the transfer phase, the fluid is at a higher pressure and is contained within expansion space 22, as depicted in FIG. 1c.

During the third (expansion) phase of the engine cycle, the volume of expansion space 22 increases as heat is drawn in from outside engine 10, thereby converting heat to work. In practice, heat is provided to the fluid in expansion space 22 by means of a heater 64 (shown in FIG. 2) which is discussed in greater detail in the description below. At the end of the expansion phase, the hot fluid fills the full expansion space 22 as depicted in FIG. 1d. During the fourth phase of the engine cycle, the fluid is transferred from expansion space 22 to compression space 24, heating regenerator 26 as the fluid passes through it. At the end of the second transfer phase, the fluid is in compression space 24, as depicted in FIG. 1a, and is ready for a repetition of the compression phase. The Stirling cycle is depicted in a P-V (pressure-volume) diagram as shown in FIG. 1e and in a T-S (temperature-entropy) diagram as shown in FIG. 1f. The Stirling cycle is a closed cycle in that the working fluid is typically not replaced during the course of the cycle.

Stirling cycle engines have not generally been used in practical applications, due to several daunting engineering challenges to their development. These involve such practical considerations as efficiency, vibration, lifetime, and cost. The instant invention addresses these considerations.

SUMMARY OF THE INVENTION

In accordance with preferred embodiments of the invention, a method is provided for controlling the fuel-air ratio of a burner of an external combustion engine having a heater head, where the burner uses a blower responsive to a blower drive signal for injecting air into the burner. The method is based at least on the concentration of a gas in an exhaust gas product of a combustion chamber of the burner and includes measuring the gas concentration in the exhaust gas product, deriving a gas concentration signal from the measured gas concentration, determining the fuel-air ratio from the gas concentration signal and the sign of the derivative of the gas concentration signal with respect to the blower drive signal, and controlling the fuel-air ratio by adjusting an air flow rate into the burner.

In accordance with another embodiment of the invention, the gas concentration in the exhaust gas product of the burner is measured using a gas composition sensor. The gas composition sensor may be an oxygen sensor or a carbon monoxide sensor. The air flow rate may be adjusted to obtain a predetermined optimal fuel-air ratio, where the optimal fuel-air ratio is based on at least a temperature of the air injected into the combustion chamber of the burner. In one embodiment, the temperature of the air may be measured using a temperature sensor. In another embodiment, the temperature of the air is determined based at least on a temperature of the heater head.

In a further embodiment, the gas composition sensor is a carbon monoxide sensor and the air flow rate into the burner is adjusted to minimize the gas concentration signal produced by the carbon monoxide sensor. Alternatively, the air flow rate may be adjusted to obtain a gas concentration signal from the carbon monoxide sensor that is below a predetermined value.

In accordance with another aspect of the present invention, a system is taught for controlling the fuel-air ratio of a burner of an external combustion engine having a heater head. The system is based at least on the concentration of a gas in an exhaust gas product of a combustion chamber of the burner, and includes a sensor for measuring the gas concentration in the exhaust gas product of the combustion chamber of the burner and for generating a sensor signal. The system also includes a blower governed by a blower signal for injecting air into the burner. The system further includes a controller for receiving the sensor signal from the sensor. The controller adjusts the blower based at least on the sign of the derivative of the sensor signal with respect to the blower drive signal to control the fuel-air ratio in the burner.

In another embodiment, the system includes a gas composition sensor for monitoring the gas concentration in the exhaust gas product of the burner. The gas composition sensor may be an oxygen sensor or a carbon monoxide sensor. The air flow rate may be adjusted to obtain a predetermined optimal fuel-air ratio, where the optimal fuel-air ratio is based on at least a temperature of the air injected into the combustion chamber of the burner. In one embodiment, the temperature of the air may be measured using a temperature sensor. In another embodiment, the temperature of the air is determined based at least on a temperature of the heater head.

In a further embodiment, the gas composition sensor is a carbon monoxide sensor and the air flow rate into the burner is adjusted to minimize the gas concentration signal produced by the carbon monoxide sensor. Alternatively, the air flow rate may be adjusted to obtain a gas concentration signal from the carbon monoxide sensor that is below a predetermined value.

In accordance with another aspect of the invention, a method for controlling the fuel-air ratio of a fuel-air mixture in a burner of an external combustion engine having a heater head includes determining the fuel-air ratio in the burner and determining a temperature of the preheated air used in the fuel-air mixture in the burner. An air flow rate is adjusted to obtain a predetermined fuel-air ratio, where the optimal fuel-air ratio is based on at least the temperature of the preheated air. In one embodiment, the temperature of the preheated air may be measured using a temperature sensor. In another embodiment, the temperature of the preheated air is determined based at least on a temperature of the heater head.

In accordance with yet another aspect of the invention, a method for igniting a fuel-air mixture, having a fuel-air ratio, in a burner includes determining an optimal fuel-air ratio for igniting the fuel air mixture based on at least the temperature of the air used in the fuel-air mixture. The method further includes setting the fuel-air ratio to an initial ignition fuel-air ratio that contains a higher amount of fuel than the optimal fuel-air ratio by adjusting a fuel-flow rate into the burner. The initial ignition fuel-air ratio is maintained until the fuel-air mixture ignites. Once the fuel-air mixture has ignited, the fuel flow rate is reduced to obtain the optimal fuel-air ratio.

In another embodiment, a method for igniting a fuel-air mixture in a burner includes setting the fuel-air ratio of the fuel-air mixture to an ignition fuel-air ratio that is retrieved from a memory area of a controller of the burner and attempting to ignite the fuel-air mixture at the ignition fuel-air ratio. The method further includes adjusting the fuel-air ratio, if the fuel-air mixture does not ignite, by alternately increasing and decreasing the fuel-air ratio above and below the ignition fuel-air ratio until the fuel-air mixture ignites. The fuel-air ratio at which the fuel-air mixture ignites is then stored in the memory area of the controller as the ignition fuel-air ratio. The method may further include, before each adjustment of the fuel-air ratio, purging the burner of unburned fuel-air mixture. In one embodiment, the fuel-air ratio is adjusted by changing the air-flow rate into the burner. In another embodiment, the fuel-air ratio is adjusted by changing a fuel-flow rate into the burner.

BRIEF DESCRIPTION OF THE DRAWINGS

The invention will be more readily understood by reference to the following description, taken with the accompanying drawings, in which.

DETAILED DESCRIPTION OF PREFERRED EMBODIMENTS

Figure 1A:
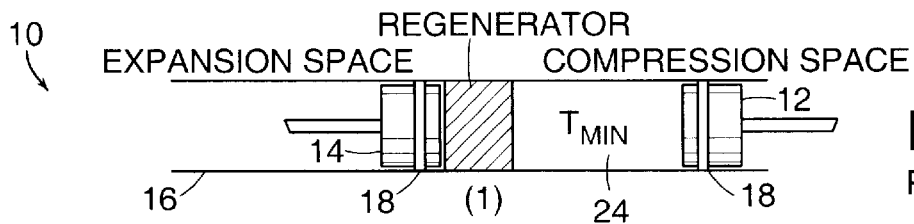
FIGS. 1a-1f depict the principle of operation of a Stirling cycle machine.
Figure 1B:
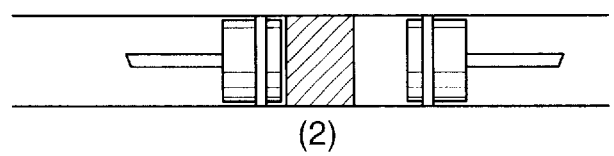
Figure 1C:
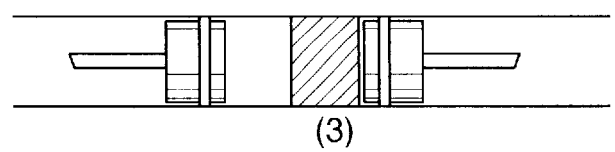
Figure 1D:
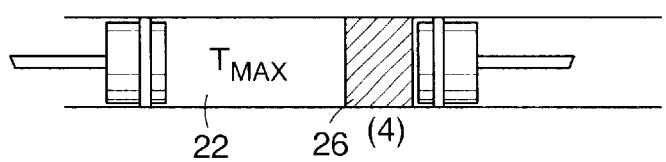
Figure 1E:
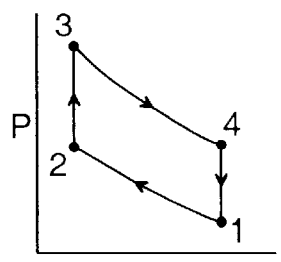
Figure 1F:
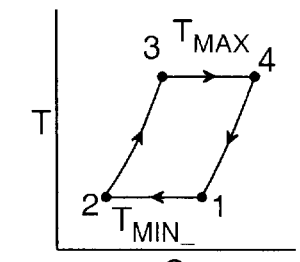
Figure 2:
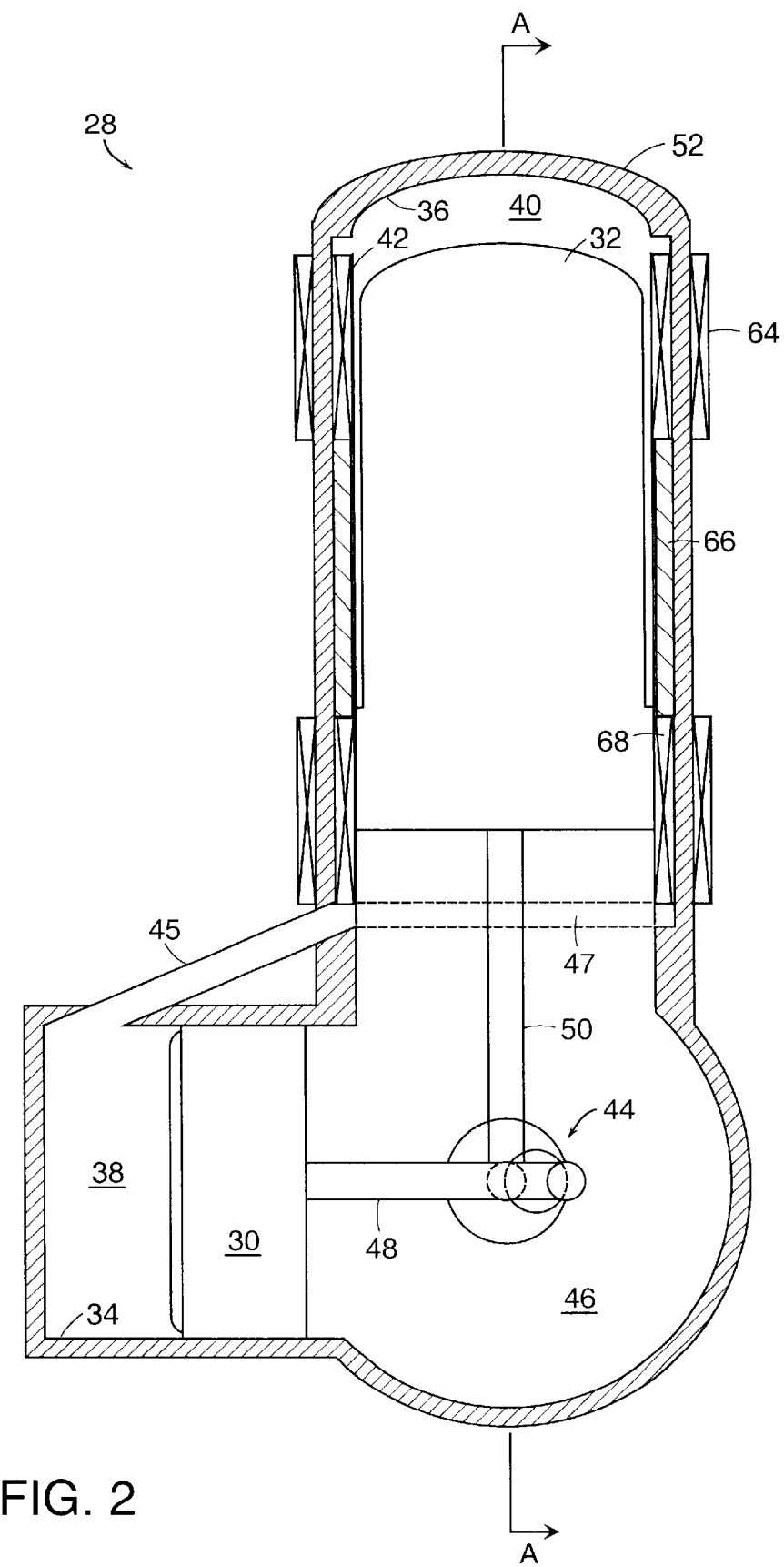
FIG. 2 is a side view in cross section of a Stirling cycle engine in accordance with an embodiment of the present invention.

Referring now to FIG. 2, one embodiment of a Stirling cycle engine is shown in cross-section and is designated generally by numeral 28. While the invention will be described generally with reference to the Stirling engine shown in FIG. 2, it is to be understood that many engines and other fuel burning boilers, furnaces, and machines may similarly benefit from various embodiments and improvements which are subjects of the present invention. The configuration of Stirling engine 28 shown in FIG. 2 is referred to as an alpha configuration, characterized in that compression piston 30 and expansion piston 32 undergo linear motion within respective and distinct cylinders: compression piston 30 in compression cylinder 34 and expansion piston 32 in expansion cylinder 36. The alpha configuration is discussed by way of example only, and without limitation of the scope of any appended claims.

In addition to compression piston 30 and expansion piston 32, the main components of Stirling engine 28 include heater 64, regenerator 66, and cooler 68. Compression piston 30 and expansion piston 32, referred to collectively as pistons, are constrained to move in reciprocating linear motion within respective volumes 38 and 40. A cylinder liner 42 may line the respective cylinder surfaces. The volumes of the cylinder interior proximate to the heater 64 and cooler 68 will be referred to, herein, as hot and cold sections, respectively, of engine 28. The relative phase (the "phase angle") of the reciprocating linear motion of compression piston 30 and expansion piston 32 is governed by their respective coupling to drive mechanism 44 housed in crankcase 46. Drive mechanism 44, may be employed to govern the relative timing of pistons and to interconvert linear and rotary motion. Compression piston 30 and expansion piston 32 are coupled, respectively, to drive mechanism 44 via a first connecting rod 48 and a second connecting rod 50. The volume 38 of compression cylinder 34 is coupled to cooler 68 via duct 45 to allow cyclic cooling of working fluid. Duct 45, more particularly, couples compression volume 38 to the annular heat exchangers comprising cooler 68, regenerator 66, and heater 64.

Expansion cylinder 36 contains a working fluid, preferably helium, which is heated by hot gases generated by a burner (not shown) by conduction through a heater head 52. In order to increase the transfer of heat from the hot gases to the working fluid, heater head may include a heat exchanger (not shown). The heat exchanger may be, for example, heating loops. In one embodiment, pins or fins are used on the heater head surface to increase the heat transfer across the heater head. The use and method of manufacture of heat transfer pins is described in copending U.S. patent application Ser. No. 09/115,381, filed Jul. 14, 1998 and copending U.S. patent application Ser. No. 09/517,245, filed Mar. 2, 2000, which are herein incorporated by reference.

Figure 4:
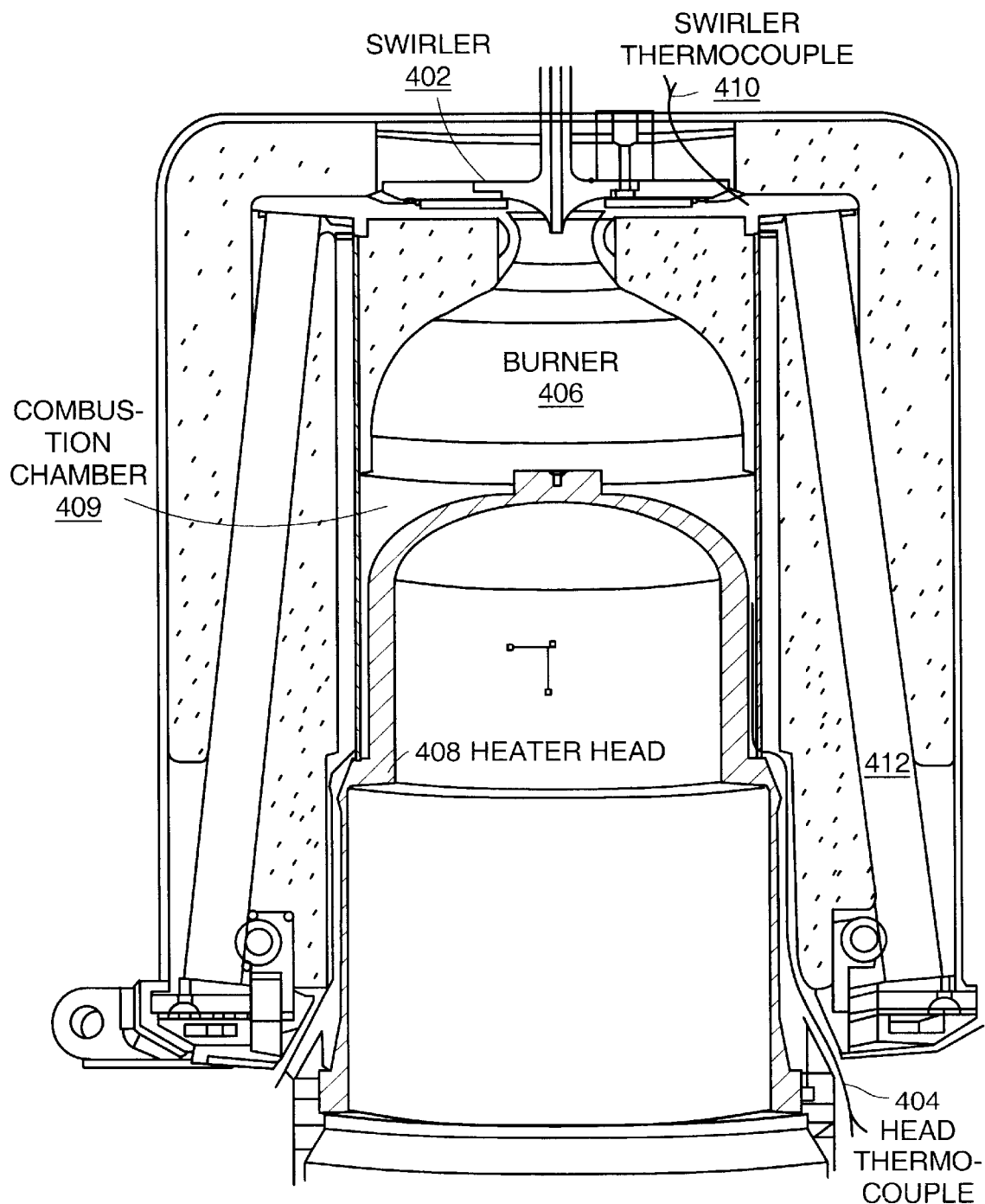
FIG. 4 is a cross section of a burner and heater head assembly showing the placement of temperature sensors in accordance with an embodiment of the invention.

While Stirling engines are capable of providing high thermal efficiency and low emission of pollutants, these objectives impose requirements of thermal efficiency, in particular, on a burner 406 employed to heat heater head 408 of the Stirling engine as shown in FIG. 4. Components of such thermal efficiency include the efficient pumping of oxidant (typically, air, and, referred to herein and in any appended claims, without limitation, as "air") through the burner 406 to provide combustion, and the recovery of hot exhaust leaving the heater head 408. In many applications, air (or other oxidant) is pre-heated, prior to combustion, nearly to the temperature of the heater head 408, so as to achieve the stated objectives of thermal efficiency. There is still a considerable amount of energy left in the combustion gases after the heater head of the Stirling engine has been heated, and, as known to persons skilled in the art, a heat exchanger may be used to transfer heat from the exhaust gases to the combustion air prior to introduction into the burner. A pre-heater 412 allows for the exchange of heat from the exhaust gases to the air taken from the ambient environment, typically from an air pump or blower.

In order to achieve high efficiency and low emissions, the burner must provide substantially complete combustion. In order to achieve substantially complete combustion, a measured amount of air as well as a gaseous fuel, such as propane, are delivered to the burner. Other gaseous fuels include natural gas, methane, butane, liquefied petroleum gas (LPG), producer gas, wood-gas and vaporized liquid fuels such as methanol and ethanol. The fuel and air flow rates are controlled in order to allow for ignition of a flame in the burner, for clean emissions after ignition and to provide thermal power to the Stirling engine. The fuel and air must also be well-mixed with sufficient amounts of oxygen to limit the emission of carbon monoxide (CO) and hydrocarbons and, additionally, must be burned at low enough flame temperatures to limit the formation of oxides of nitrogen ($NO_x$).

The high temperature of preheated air, desirable for achieving high thermal efficiency, complicates achieving low-emission goals by making it difficult to premix the fuel and air and requiring large amounts of excess air in order to limit the flame temperature. As used herein and in any appended claims, the term "auto-ignition temperature" is defined as the temperature at which a fuel will ignite without a temperature-decreasing catalyst under existing conditions of air and fuel pressure. The typical preheated air temperature exceeds the auto-ignition temperature of most fuels, potentially causing the fuel-air mixture to ignite before entering the combustion chamber. One solution to this problem is to use a non-premixed diffusion flame. However, since such diffusion flames are not well-mixed, higher than desirable emissions of CO and $NO_x$ result. A detailed discussion of flame dynamics is provided by Turns, *An Introduction to Combustion: Concepts and Applications*, (McGraw-Hill, 1996), which is incorporated herein by reference. Any increased air flow provided to limit flame temperatures typically increases the power consumed by an air pump or blower, thereby degrading overall engine efficiency.

In accordance with the present invention, low emissions and high efficiency may be provided by producing a premixed flame even in the presence of air heated above the auto-ignition temperature of the fuel, and, additionally, by minimizing the pressure drop between the air inlet and the flame region, thereby minimizing blower power consumption.

The term "flame speed" is defined as the speed at which a flame front will propagate through a particular fuel-air mixture. Within the specification and the following claims, the term "combustion axis" shall refer to the direction of predominant fluid flow upon combustion of the fluid.

Figure 3A:
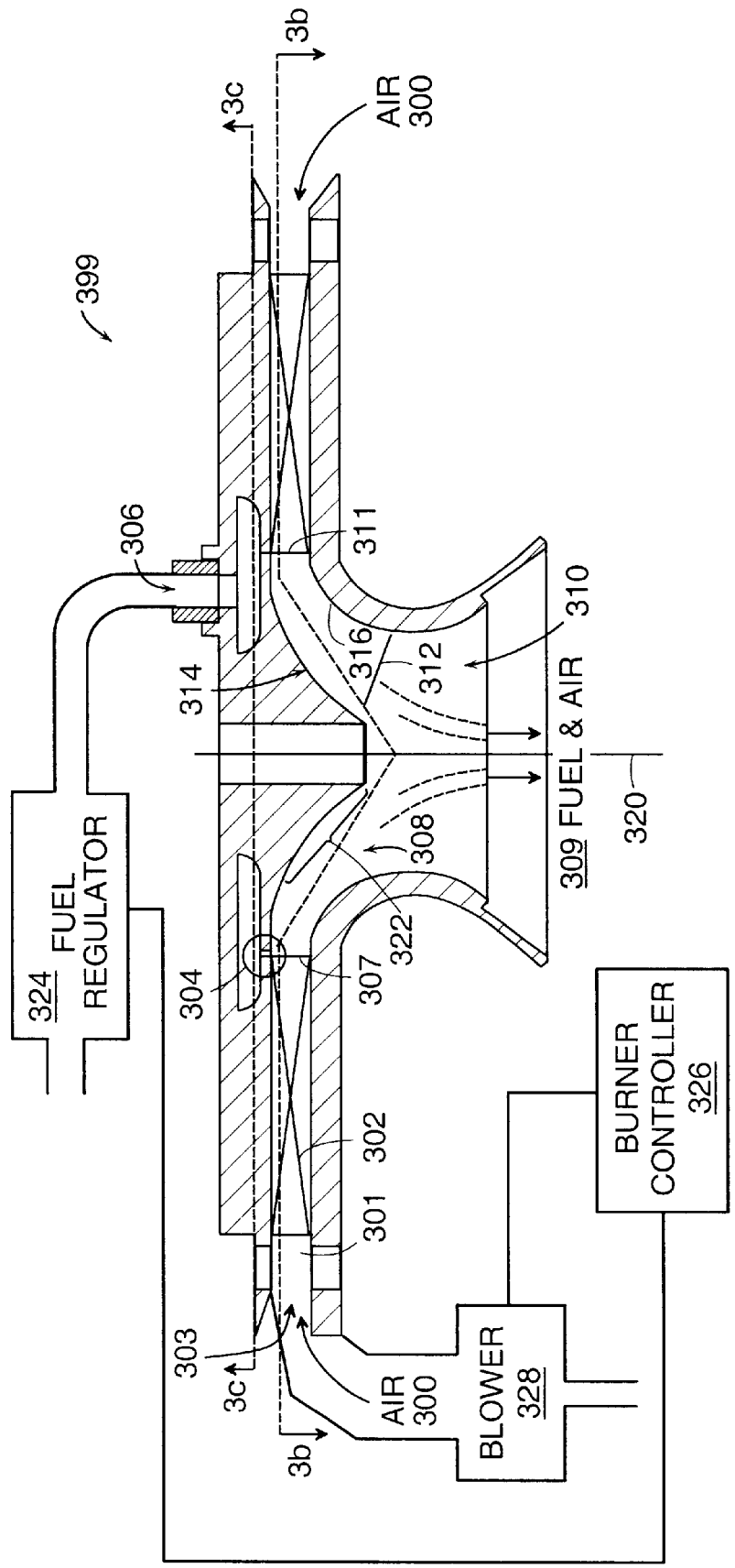
FIG. 3a shows a cross-sectional view from the side of a fuel intake manifold for a Stirling cycle engine in accordance with a preferred embodiment of the invention.
Figure 3B:
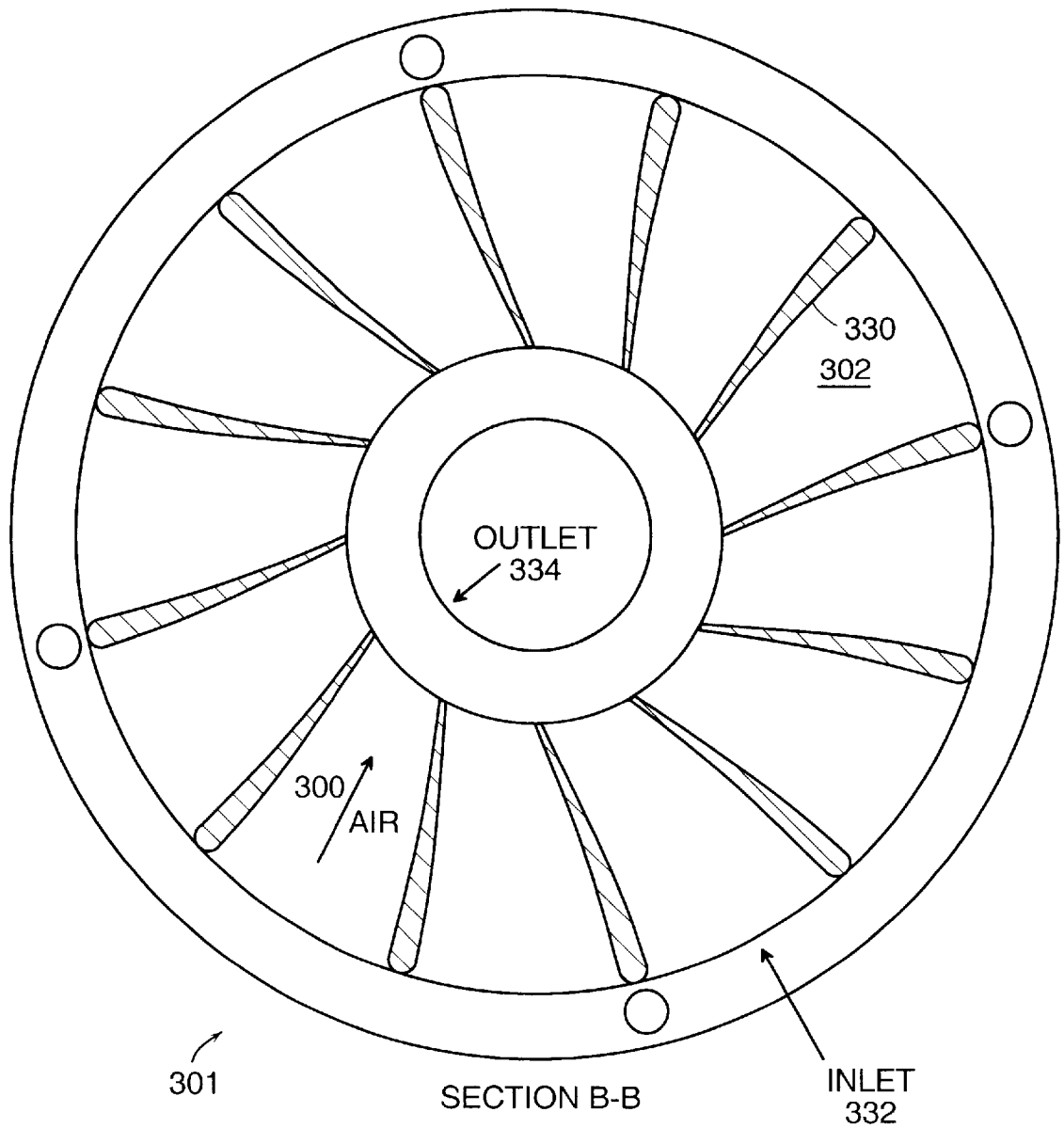
FIG. 3b shows a cross sectional view from the top of the fuel intake manifold of FIG. 3a taken through cut BB.
Figure 3C:
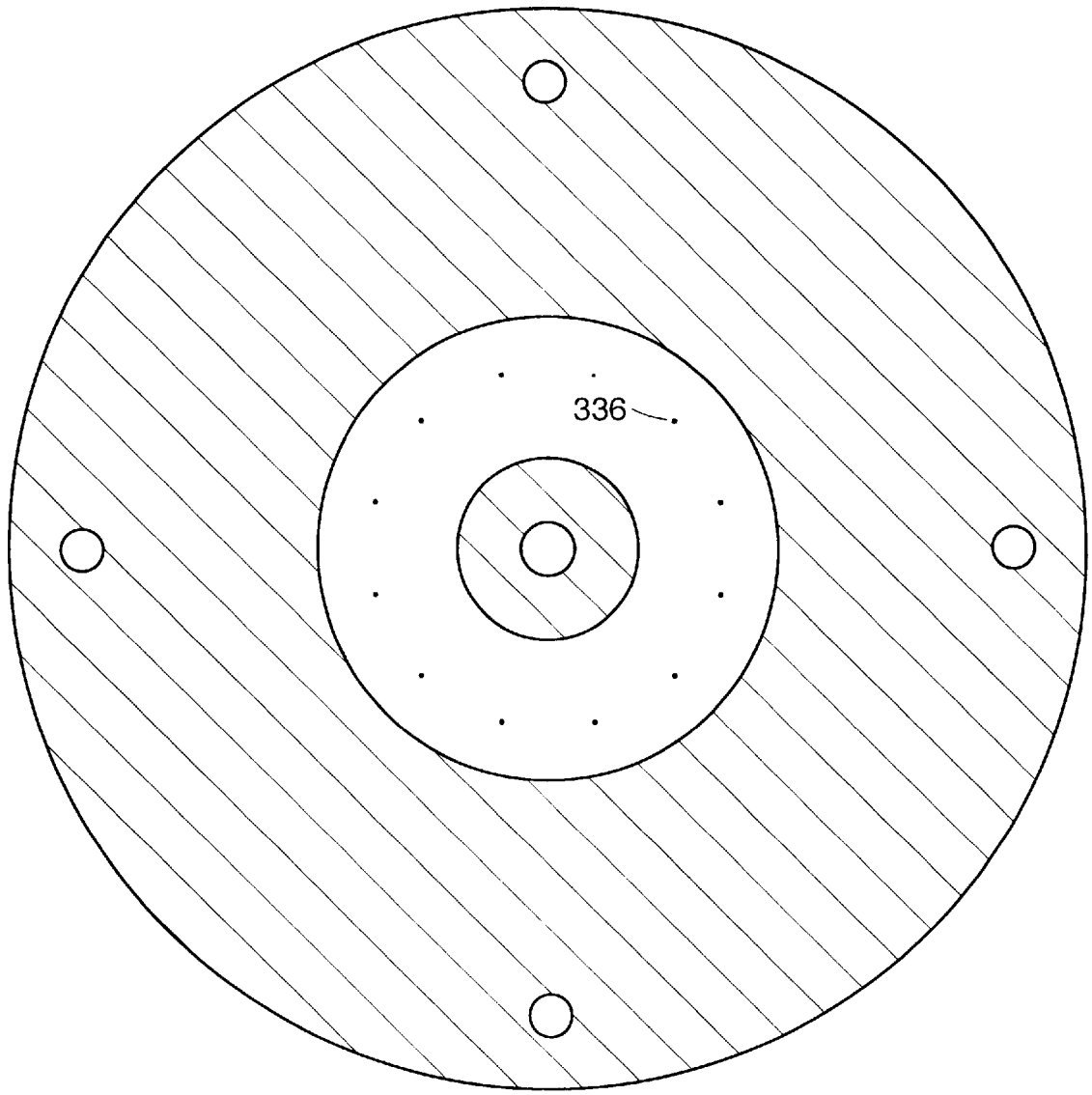
FIG. 3c is a cross sectional view from the top of the fuel intake manifold of FIG. 3a taken through cut AA, showing the fuel jet nozzles.

Referring now to FIGS. 3a-3c, an intake manifold 399 is shown for application to a Stirling cycle engine or other combustion application in accordance with an embodiment of the present invention. The preferred intake manifold and burner described herein are discussed by way of example only, and without limitation of the scope of any of the appended claims. Various other methods for building a pre-mix burner are known in the art. In accordance with a preferred embodiment of the invention, fuel is pre-mixed with air that may be heated above the fuel's auto-ignition temperature and a flame is prevented from forming until the fuel and air are well-mixed and in the combustion chamber 409 (shown in FIG. 4). FIG. 3a shows a preferred embodiment of the apparatus including an intake manifold 399 and a combustion chamber 310. The intake manifold 399 has an axisymmetrical conduit 301 with an inlet manifold 303 for receiving air 300 supplied via the blower 328. Air 300 is pre-heated to a temperature, typically above 1000 K, which may be above the auto-ignition temperature of the fuel. Conduit 301 conveys air 300 flowing inward radially with respect to combustion axis 320 to a swirler 302 disposed within the conduit 301.

FIG. 3b shows a cross sectional view of the conduit 301 including swirler 302 in accordance with an embodiment of the invention. In the embodiment of FIG. 3b, swirler 302 has several spiral-shaped vanes 330 for directing the flow of air 300 radially inward and imparting a rotational component on the air. The diameter of the swirler section of the conduit decreases from the inlet 332 to the outlet 334 of swirler 302 as defined by the length of swirler vanes 330. The decrease in diameter of swirler vanes 330 increases the flow rate of air 300 in substantially inverse proportion to the diameter. The flow rate is increased so that it is above the flame speed of the fuel. At outlet 334 of swirler 302, a gaseous fuel 306, which in a preferred embodiment is propane, is injected into the inwardly flowing air.

In a preferred embodiment, fuel 306 is injected by fuel injector 304 through a series of nozzles 336 as shown in FIG. 3c. More particularly, FIG. 3c shows a cross sectional view of conduit 301 and includes the fuel jet nozzles 336. Each of the nozzles 336 is positioned at the exit of the swirler vanes 330 and is centralized between two adjacent vanes. Nozzles 336 are positioned in this way for increasing the efficiency of mixing the air and fuel. The fuel jet nozzles 336 are sized to provide jets of fuel that extend at least half way across the conduit 301 (shown in FIGS. 3a and 3b). Calculations to size the fuel jet nozzles 336 are well known in the art and described in Beer and Chigier, "Combustion Aerodynamics," John Wiley & Sons, 1972. Nozzles 336 simultaneously inject the fuel 306 across the air flow 300. Since the air flow is faster than the flame speed, a flame will not form at that point even though the temperature of the air and fuel mixture is above the fuel's auto-ignition temperature. In a preferred embodiment, where propane is used, the preheat temperature, as governed by the temperature of the heater head, is approximately 900 K.

Referring again to FIG. 3a, the air and fuel, now mixed, referred to hereafter as either "air-fuel mixture" or "fuel-air mixture" 309, is transitioned in direction through a throat 308 which has a contoured fairing 322 and is attached to the outlet 307 of the conduit 301. Fuel 306 is supplied via fuel regulator 324. Throat 308 has an inner radius 314 and an outer dimension 316. The transition of the air-fuel mixture is from a direction that is substantially transverse and radially inward with respect to combustion axis 320 to a direction that is substantially parallel to the combustion axis. The contour of the fairing 322 of throat 308 has the shape of an inverted bell such that the cross sectional area of throat 308 with respect to the average flow path remains constant from the inlet 311 of the throat to outlet 312 of the throat. The contour is smooth without steps and maintains the flow speed from the outlet of the swirler to the outlet of the throat 308 to avoid separation and the resulting recirculation along any of the surfaces. The constant cross sectional area allows the air and fuel to continue to mix without decreasing the flow speed or causing a pressure drop. A smooth and constant cross section produces an efficient swirler, where swirler efficiency refers to the fraction of static pressure drop across the swirler that is converted to swirling flow dynamic pressure. Swirl efficiencies of better than 80% may typically be achieved by practice of the invention. Thus, the parasitic power drain of the combustion air fan may be minimized.

Outlet 312 of the throat flares outward allowing the air-fuel mixture 309 to disperse into the chamber 310 slowing the air-fuel mixture 309 below its flame speed thereby localizing and containing the flame. The rotational momentum generated by the swirler 302 produces a flame stabilizing ring vortex as well known in the art.

As discussed above, the fuel and air flow rates are controlled in order to allow for ignition of a flame in the burner as well as for clean emissions after ignition. Referring to FIG. 3a, burner controller 326 is used to control the fuel and air flow rates provided by fuel regulator 324 and blower 328 respectively. The fuel regulator 324 is set to an initial value for ignition. Once the flame is proved, the burner controller 326 varies the fuel flow rate to control the heater head temperature as measured by a head temperature sensor 404 (shown in FIG. 4). A flame is proved when a flame detector detects the presence of the flame. There are several types of flame detectors including thermocouples and ultraviolet sensors known in the art. Flame detection methods are discussed in copending U.S. patent application Ser. No. 09/517,808, filed Mar. 2, 2000, which is herein incorporated by reference.

The output (or air mass flow rate) of the combustion air blower 328 is set by the burner controller 326 to control the fuel-air ratio in the combustion chamber 409 (shown in FIG. 4). The fuel-air ratio is the ratio of the fuel mass flow rate to the air mass flow rate and is a primary factor affecting emissions. The blower 328 controls the fuel-air ratio by increasing or decreasing the air mass flow rate relative to the fuel mass flow rate. For example, in order to hold the fuel-air ratio constant, the burner controller 326 will increase the blower output as the fuel regulator 324 increases its output and vice versa. The desired fuel-air ratio and the fuel flow rate may be changing at the same time, so the burner controller 326 will change the output of the blower 328 to accommodate both the change in desired fuel-air ratio and the fuel flow rate.

Minimizing the emissions of carbon monoxide (CO), hydrocarbons (HC) and oxides of nitrogen ($NO_x$) requires a lean fuel-air mixture that still achieves complete combustion. A lean fuel-air mixture has more air than a stoichiometric mixture (i.e., 15.67 grams of air per gram of fuel, if propane is used, for example). As more air is added to a fixed amount of fuel, the emissions of CO, HC and $NO_x$ will decrease until the fraction of air in the fuel-air mixture is large enough that the flame becomes unstable. At this point, pockets of the fuel-air mixture will pass through the burner without complete combustion. Incomplete combustion of the fuel-air mixture produces large amounts of CO and HC. The CO and HC emissions will quickly increase as more air is added to the fuel-air mixture until the flame extinguishes at a Lean Blow-Out limit ("LBO"). The LBO will increase as the temperature of the incoming air (i.e., the preheated air) increases. As a result, the optimal fuel-air ratio of the fuel-air mixture decreases as the temperature of the preheated air increases during the warmup phase of the Stirling engine. Once the engine is warmed up, the fuel-air ratio is held at or below the optimal fuel-air ratio for operation of the engine.

Accordingly, the fuel-air ratio must first be controlled to provide the optimal fuel-air ratio for ignition. Once the flame is proved, the fuel-air ratio is controlled to minimize emissions based upon the temperature of the preheated air and the fuel type. When the fuel flow rate is increased or decreased to adjust the temperature of the heater head, the air flow rate is also adjusted to maintain the desired fuel-air ratio.

A given fuel will only ignite over a limited range of fuel-air ratios. At ignition, an ignition fuel-air ratio is chosen which is slightly above or below the stoichiometric fuel-air ratio corresponding to the fuel being used. As mentioned above, use of a lean fuel-air mixture minimizes the emissions of carbon monoxide (CO), hydrocarbons (HC) and oxides of nitrogen ($NO_x$). Typically, however, lighting a lean pre-mixed fuel-air mixture can be difficult.

Figure 5A:
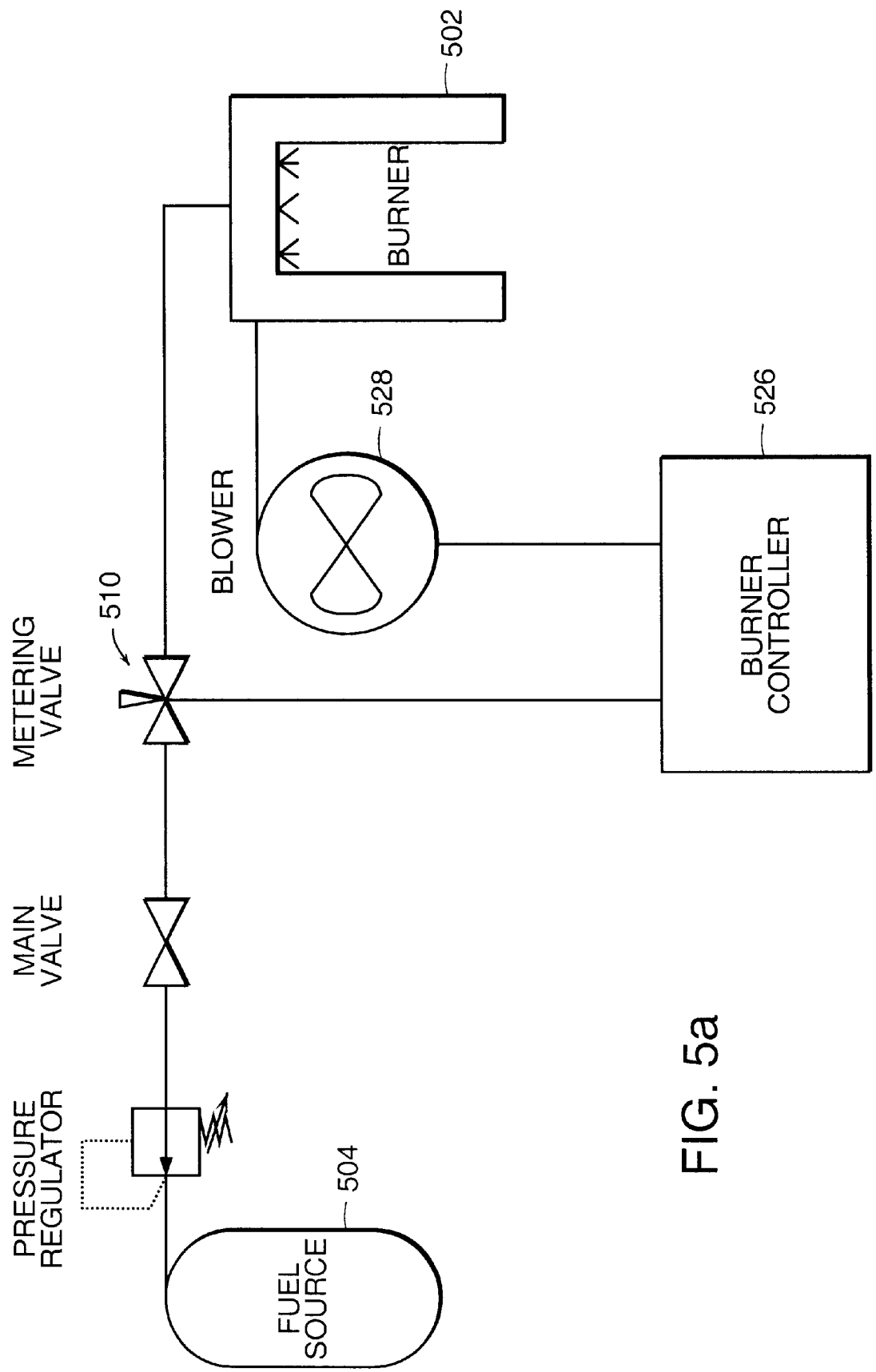
FIG. 5a is a schematic block diagram showing a system for control of the fuel and air provided to a burner in accordance with an embodiment of the invention.

In accordance with an embodiment of the invention, a "choked" state is used to aid in lighting the lean pre-mixed fuel-air mixture in a burner. FIG. 5a is a schematic block diagram showing a system for control of the fuel and air provided to a burner in accordance with an embodiment of the invention. A burner 502 is coupled to a blower 528 and a fuel source 504. A burner controller 526 is used to control the fuel and air provided to the burner 502. As discussed above with respect to FIGS. 3a-3c, burner 502 may include an intake manifold used to pre-mix the fuel from the fuel source 504 and the air from the blower 528 to form a fuel-air mixture.

A choked state is achieved by specifying, using the burner controller 526, an initial relatively rich ignition fuel-air ratio that is used to light the premixed fuel-air mixture. Once a flame is established, the ignition fuel-air ratio is then adjusted to a leaner fuel-air ratio using metering valve 510 to reduce the fuel flow. Metering valve 510 may be a fast acting metering valve generally known in the art. The adjustment of the fuel-air ratio from a rich mixture to a lean mixture is done over a short period of time (e.g., a fraction of a second) in order to help stabilize the flame.

Figure 5B:
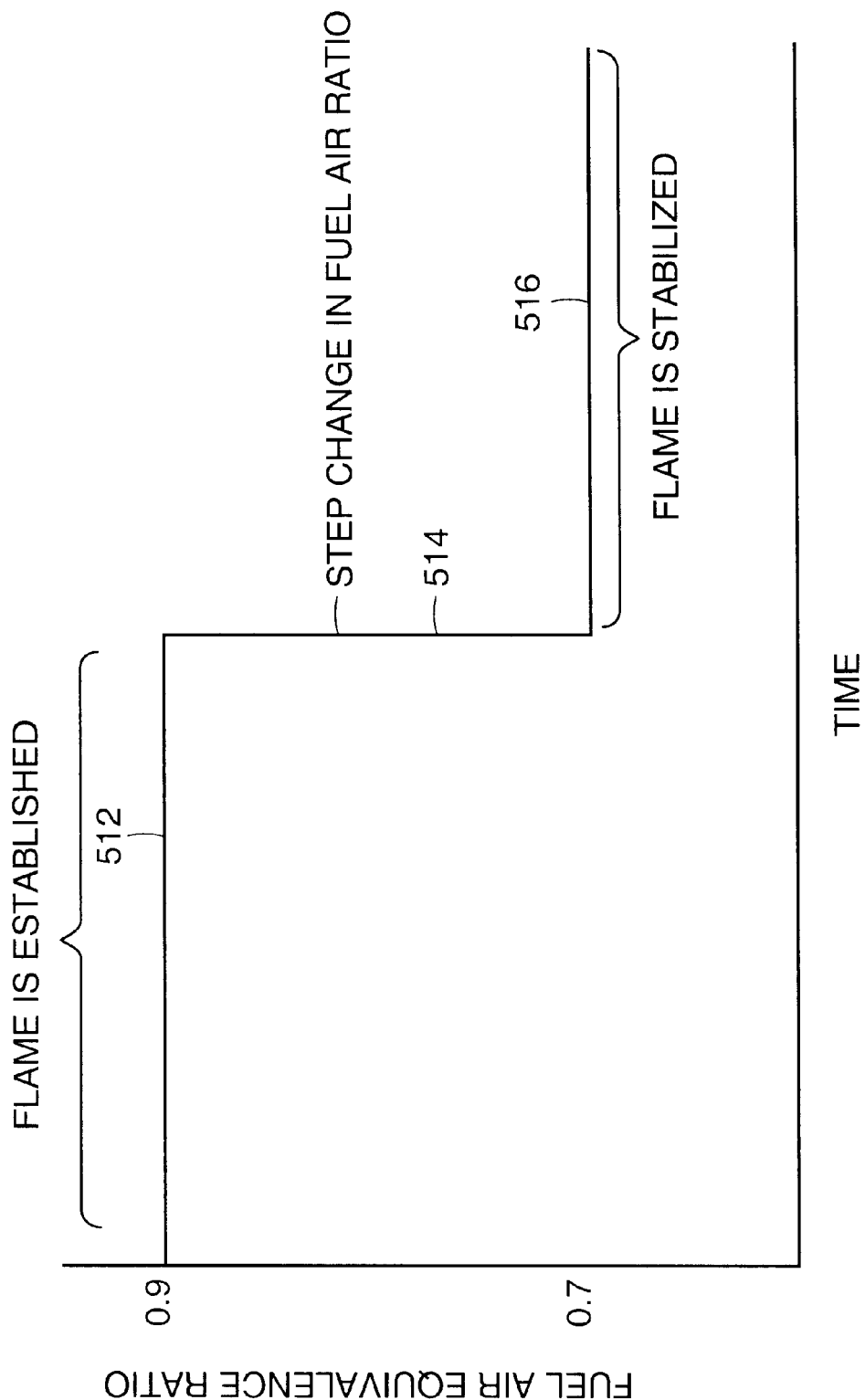
FIG. 5b illustrates an exemplary ignition fuel-air equivalence ratio over time used to ignite a fuel-air mixture in accordance with an embodiment of the invention.

FIG. 5b illustrates an exemplary ignition fuel-air equivalence ratio over time used to ignite a fuel-air mixture in accordance with an embodiment of the invention. In FIG. 5b, a fuel-air equivalence ratio is plotted versus time. The term fuel-air equivalence ratio is well known in the art and is the is fuel-air ratio (as defined above) normalized to a stoichiometric fuel-air ratio. The behavior of the fuel-air equivalence ratio and the fuel-air ratio are similar and the following discussion will refer to the fuel-air ratio. In the embodiment shown in FIG. 5b, the ignition fuel-air ratio of the fuel-air mixture is initially set to a relatively rich mixture. In a preferred embodiment using propane as the fuel, the initial fuel-air mixture is set to 0.9 grams fuel per gram of air. Once the flame is established 512, the fuel flow from fuel source 504 (shown in FIG. 5a) is reduced over a short period of time (e.g., a fraction of a second), while a constant air flow rate is maintained by blower 528 (shown in FIG. 5a) in order to reduce 514 the fuel-air ratio. In FIG. 5b, the fuel-air ratio is reduced to 0.7 grams fuel per gram of air. As mentioned above with respect to FIG. 5a, a fast acting metering valve 510 may be used to reduce the fuel flow. The flame will generally stabilize 516 at the leaner fuel-air ratio.

Another problem encountered when attempting to ignite a fuel-air mixture in a burner is the variation in burner behavior that may occur as a result of inconsistencies in materials and manufacture, as well as normal material breakdown. The variation in burner behavior may be of particular concern during the cold lighting of the fuel-air mixture in a burner. Any changes in the system, such as the inconsistencies mentioned above, may cause the fuel-air mixture in the burner to fail to light. As a result, it is important to use the appropriate fuel-air ratio during the lighting sequence. As mentioned above, a given fuel will only ignite over a limited range of fuel-air ratios. The range for the "ignition fuel-air ratio" may be very narrow under some operating conditions.

Figure 6:
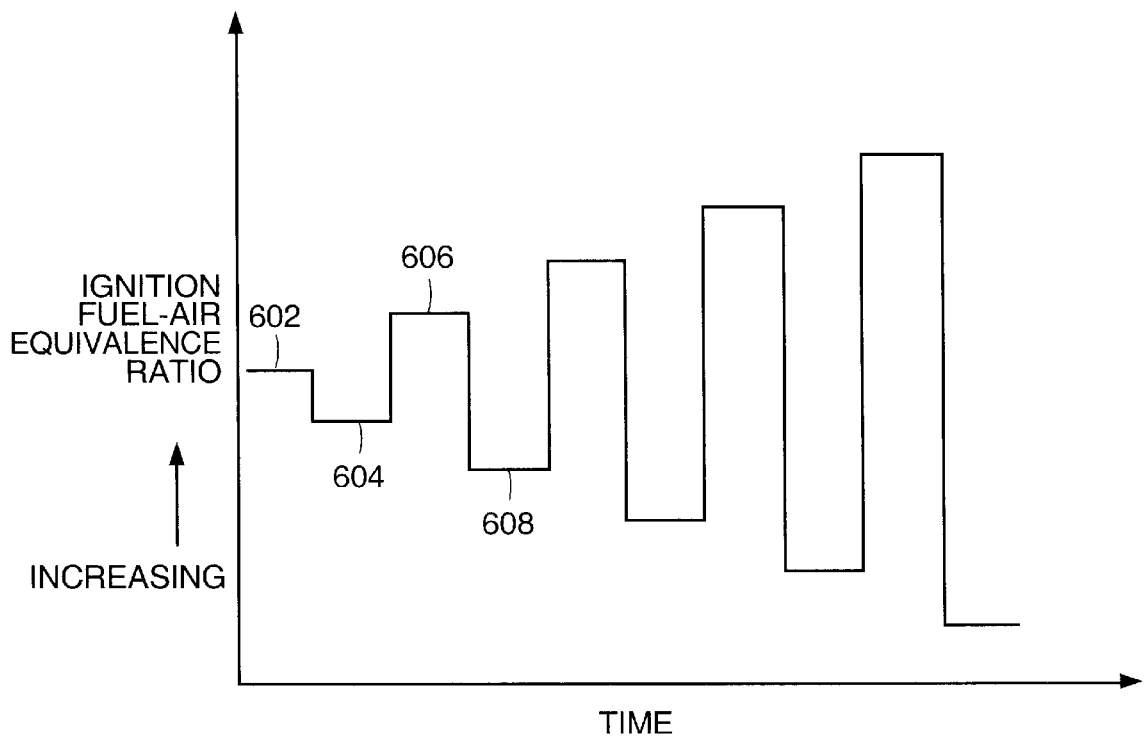
FIG. 6 illustrates graphically an alternating stepwise sequence of ignition fuel-air equivalence ratio that may be used by a burner controller to light a fuel-air mixture.

In accordance with an embodiment of the invention, burner controller 526 (as shown in FIG. 5a) may implement an adaptive process to locate an appropriate fuel-air ratio for ignition of the fuel-air mixture in the burner. FIG. 6 illustrates graphically an alternating stepwise sequence of ignition fuel-air equivalence ratios that may be used by a burner controller to light a fuel-air mixture. As discussed above, the fuel-air equivalence ratio is the fuel-air ratio normalized to a stoichiometric fuel air ratio. In accordance with an embodiment of the invention, the burner controller stores the last ignition fuel air ratio that was used to successfully light the fuel air mixture. This historical ignition fuel-air ratio value may then be used during subsequent lighting attempts. As shown in FIG. 6, the burner controller uses the stored ignition fuel air ratio 602 in its first attempt to light the fuel-air mixture. If the first attempt fails, the ignition fuel air ratio is lowered to a second ignition fuel-air ratio 604. In one embodiment, the burner is purged of the unburned fuel-air mixture before adjusting the fuel-air ratio. The ignition fuel-air ratio may be adjusted by either changing the fuel flow or changing the air flow. Preferably, the amount of air supplied to the burner is changed because the blower typically provides for a finer adjustment.

If the fuel-air mixture ignites at the second ignition fuel-air ratio 604, the second ignition fuel-air ratio is stored by the burner controller to use in future attempts to light or re-light the fuel-air mixture in the burner. If the second ignition fuel-air ratio 604 fails, the burner controller will then increase the ignition fuel-air ratio to a third ignition fuel-air ratio 606 that is higher than the first 602 or second 604 ignition fuel-air ratios. As mentioned above, the burner may be purged of the unburned fuel-air mixture before adjusting the fuel-air ratio. If the fuel-air mixture is successfully ignited at the third ignition fuel-air ratio, the third ignition fuel-air ratio 606 is stored by the burner controller for use as a starting point for future attempts to light the fuel-air mixture. If the fuel-air mixture in the burner does not ignite at the third ignition fuel-air ratio, then the process continues and the ignition fuel-air ratio is again lowered to a fourth ignition fuel-air ratio 608. The fourth ignition fuel-air ratio 608 is lower than both the first 602 and second 604 ignition fuel air ratios. The sequence of ignition fuel-air ratios, as shown in FIG. 6, is repeated until the fuel-air mixture in the burner successfully ignites. The value of the ignition fuel-air ratio at which the fuel-air mixture ignites is then stored (and replaces any previously stored value) by the burner controller for the next attempt at lighting or re-lighting the fuel-air mixture. This process allows the burner system to adapt to component degradation and other changes.

The lighting behavior of the fuel-air mixture in the burner may also be affected by changes in the flammability limits for the fuel caused by the preheated air temperature. At higher preheated air temperatures, a leaner fuel-air mixture will light more easily and still achieve a stable flame. Accordingly, the ignition fuel air ratio, as determined, for example, by the methods described above, may be adjusted or offset based on the preheated air temperature in order to ensure proper lighting. As discussed above, use of a lean fuel-air mixture minimizes emissions of carbon monoxide (CO), hydrocarbons (HC) and oxides of nitrogen ($NO_x$). The temperature of the preheated air is preferably measured using a temperature sensor, such as a thermocouple 410, in an air swirler 402 coupled to the combustion chamber 409 as shown in FIG. 4. The measured preheated air temperature may then used to determine an appropriate offset to the ignition fuel-air ratio based on a predetermined relationship between the preheated air temperature and the fuel-air ratio for ignition. As mentioned above, generally, a leaner fuel-air mixture may be used at higher preheated air temperatures. Therefore, in one embodiment, at a high preheated air temperature, the ignition fuel-air ratio will be lowered to a leaner ignition fuel-air ratio.

The ignition fuel-air ratio is maintained until the flame stabilizes and the temperature of the interior of the combustion chamber increases to a warm-up temperature. Referring to FIG. 4, the temperature of the combustion chamber 409 is typically determined by measuring the temperature of the heater head 408 or by allowing a predetermined time interval for the combustion chamber to heat. A temperature sensor, such as thermocouple 404, may be used to measure the temperature of heater head 408. In a preferred embodiment, the ignition fuel-air ratio is held until the heater head temperature reaches 300° C. and the flame has been lit for 5 seconds.

Figure 8:
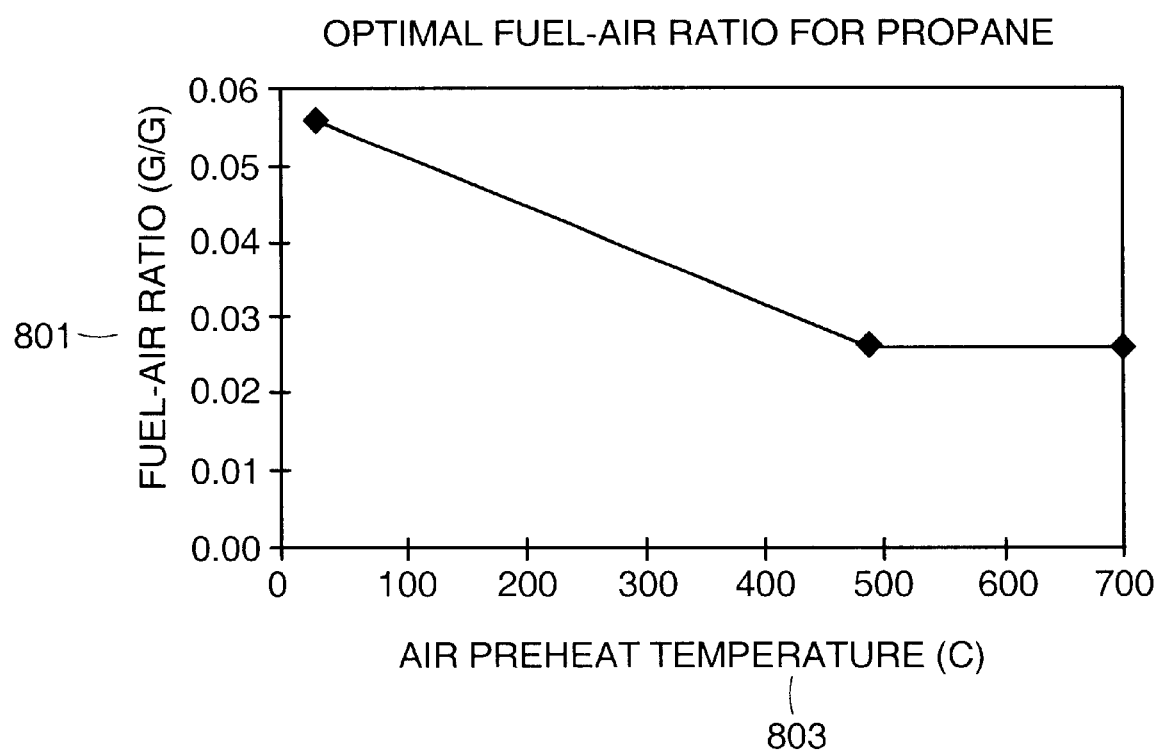
FIG. 8 shows the relationship of the optimal fuel-air ratio to the air preheat temperature for propane in accordance with an embodiment of the invention.

Once the flame is stabilized, and the temperature of the combustion chamber 409 reaches the desired warm-up temperature, the fuel-air ratio is then controlled based upon the air preheat temperature and the fuel type. As described above, the optimal fuel-air ratio 801 of the fuel-air mixture decreases as the temperature of the preheated air 803 increases as shown in FIG. 8. The temperature of the preheated air is preferably measured using a high temperature sensor that is placed in the incoming air stream just before the fuel is added to the preheated air. For example, in FIG. 4, a temperature sensor 410 may be placed in the air swirler 402 to measure the temperature of the preheated air.

Figure 7:
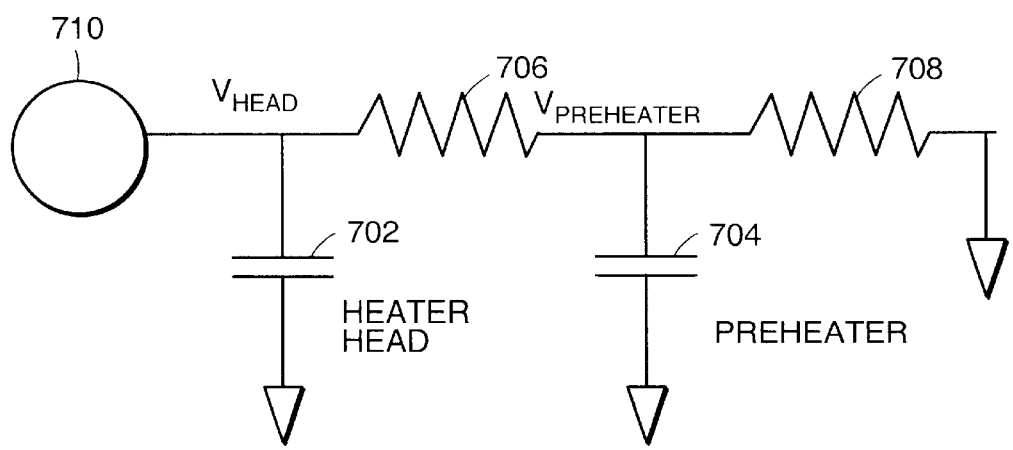
FIG. 7 illustrates an electrical model of the thermal behavior of a heater head and pre-heater in accordance with an embodiment of the invention.

Alternatively, the temperature of the preheated air may be inferred from the heater head temperature. The preheated air temperature may be estimated from the measured heater head temperature and a mathematical thermal model of the heater head, burner and preheater. Such a model may be based on an electrical analogue of capacitors and resistors as shown in FIG. 7. FIG. 7 illustrates an electrical model of the thermal behavior of the heater head and pre-heater in accordance with an embodiment of the invention. It is well known in the art to represent thermal systems using electrical analogues. The mathematical model, as shown in FIG. 7, may be used by the burner controller to estimate the preheated air temperature based on the measured heater head temperature.

In FIG. 7, the thermal power produced by the burner is represented by the current source 710. $V_{head}$ is the known heater head temperature. A temperature sensor, such as a thermocouple 404 shown in FIG. 4, may be used to measure the temperature of the heater head. Returning to FIG. 7, the preheated air temperature is approximately the temperature of the pre-heater, heater, $V_{preheater}$. Capacitor 702 represents the thermal capacitance of the heater head and capacitor 704 represents the thermal capacitance of the pre-heater. Resistor 706 represents the thermal resistance between the combustion gases leaving the heater head and the pre-heater. Resistor 708 represents the thermal resistance between the preheater and the incoming preheated air. The set of equations that may be used to describe the electrical analogue shown in FIG. 7 and the solution for the preheater temperature $V_{preheater}$ is well known in the art. Based on the thermal math model, the preheated air temperature may be approximated by subtracting several hundred degrees Celsius from the heater head temperature. In one embodiment, the preheated air temperature is taken as the heater head temperature minus 300° C.

The optimal fuel-air ratio will first decrease linearly with the preheated air temperature from a "start" fuel-air ratio for room temperature air to a "run" fuel air ratio, for a warmed up preheated air temperature. The air is considered fully warmed up when it exceeds the known auto-ignition temperature for the fuel. For example, the auto-ignition temperature for propane is 490° C. In a preferred embodiment, where the fuel is propane, the "start" fuel-air ratio is 0.052 grams of fuel to grams of air, which results in approximately 4% oxygen in the exhaust of the Stirling engine. The "run" fuel-air ratio in the preferred embodiment, is 0.026 grams of fuel to grams of air, which results in approximately 13% oxygen in the exhaust of the Stirling engine.

Figure 9:
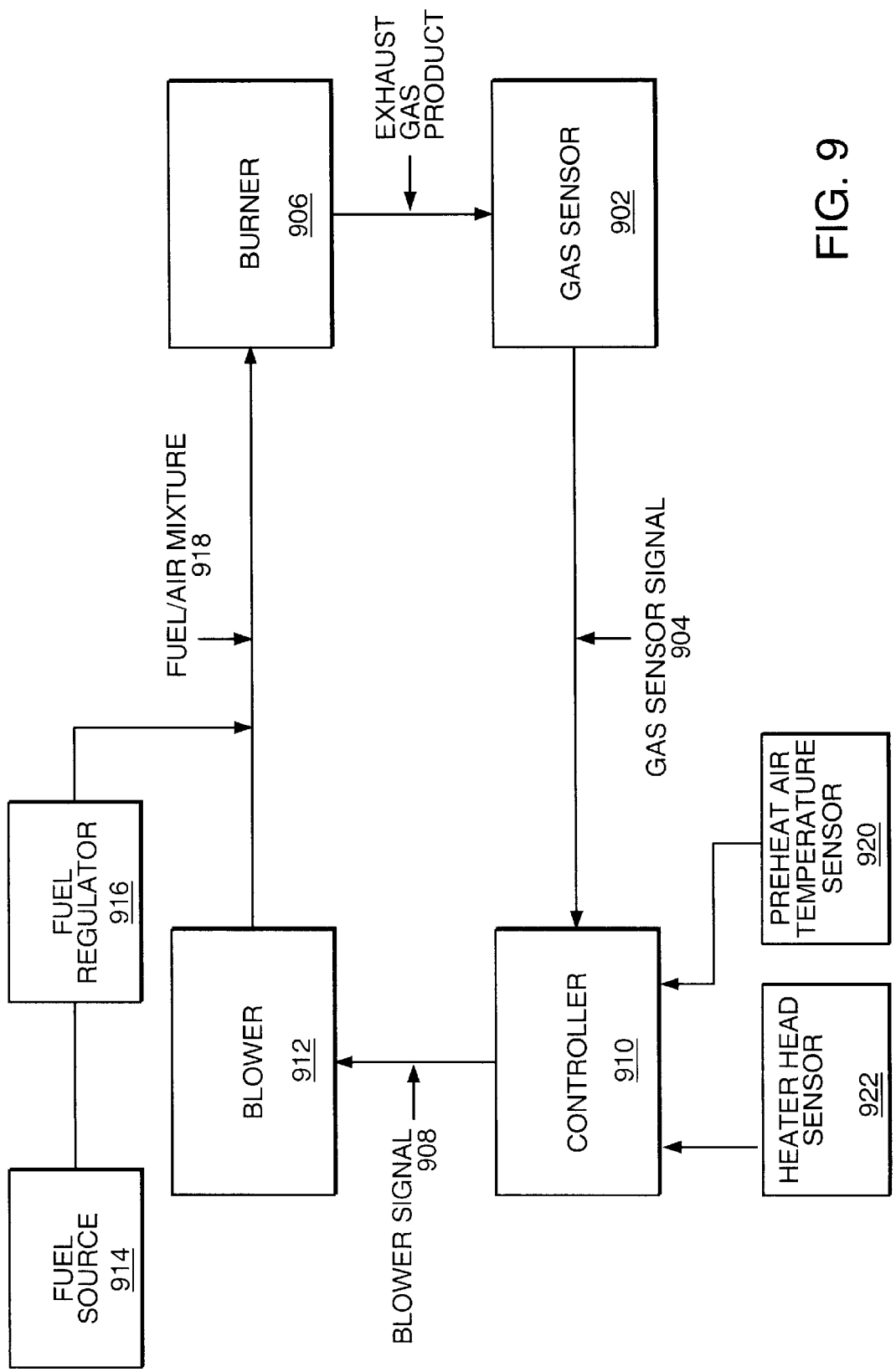
FIG. 9 is a block diagram showing oxygen sensor control of the blower in accordance with a preferred embodiment of the invention.
Figure 10:
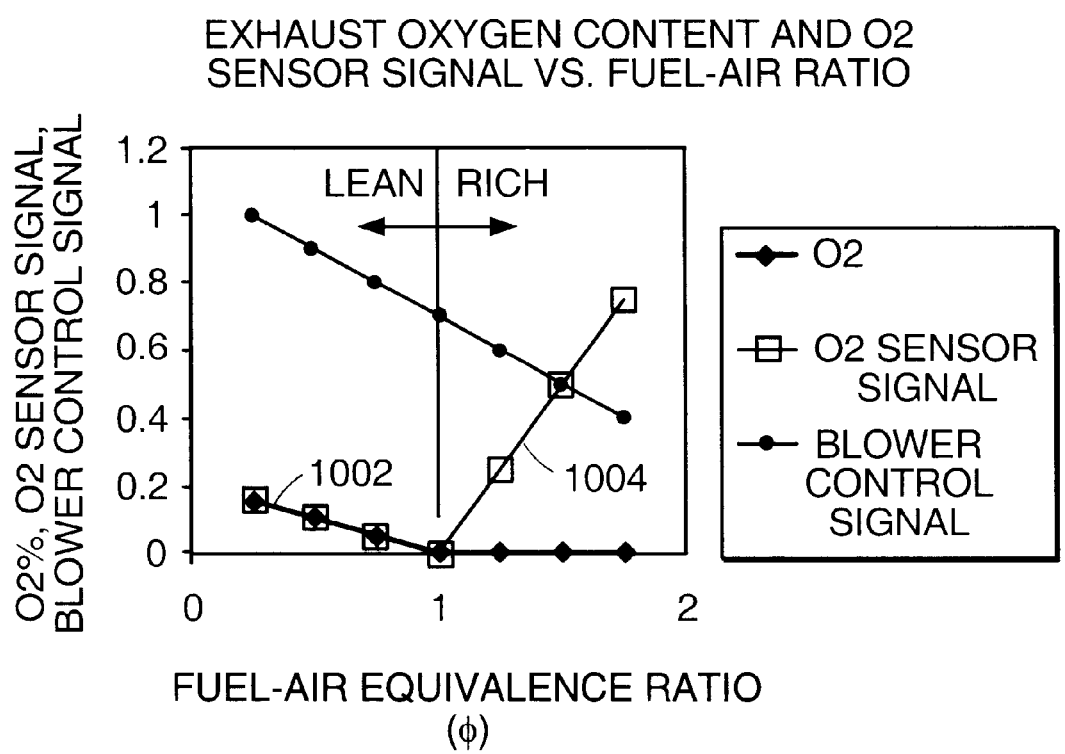
FIG. 10 shows the relationship between fuel-air equivalence ratio and the percentage of exhaust oxygen, and between the fuel-air equivalence ratio and the signal of a typical oxygen sensor in accordance with a preferred embodiment of the invention.

The determination of the fuel-air ratio may be based on a measurement of the oxygen content in the exhaust of the Stirling engine. Referring to FIG. 9, a gas sensor 902 may be placed in the path of the exhaust gasses from combustion chamber 310 (as shown in FIG. 3*a*) to sample the exhaust gas and measure the percentage of a particular gas present in the exhaust. In the embodiment described below, the gas sensor 902 is an oxygen sensor and is used to measure the percentage of oxygen in the exhaust. Oxygen sensors 902, such as those based on zirconium-oxide, may be used to measure the oxygen level. Many oxygen sensors, such as Zirconium-oxide sensors, have a non-monotonic response to changes in the fuel-air ratio of the fuel air mixture 918 as shown in FIG. 10, which is discussed further below. FIG. 10 shows the relationship between the fuel-air equivalence ratio and the percentage of exhaust oxygen, and between the fuel-air equivalence ratio and the signal of an oxygen sensor, such as a zirconium-oxide sensor.

Returning to FIG. 9, after measuring the exhaust oxygen level, the gas sensor 902 provides a signal 904 to the burner controller (or fuel-air controller) 910 which outputs a blower signal 908 to the blower 912. The air provided by blower 912 is then mixed with fuel provided by a fuel regulator 916 from a fuel source 914 to form a fuel-air mixture 918. When there is sufficient air-flow into the burner, there are varying amounts of excess oxygen in the exhaust for the gas sensor 902 to measure. In a lean environment, the gas sensor signal will be proportional to the oxygen present in the exhaust as shown by curve 1002 in FIG. 10. If the air-flow drops low enough, however, there will be no oxygen in the exhaust. Instead, large amounts of carbon monoxide will be present in the exhaust indicating incomplete combustion. In this fuel-rich or oxygen deficient situation, the gas sensor responds to the carbon monoxide (CO) instead of the oxygen. The gas sensor signal will be proportional to the fuel-air equivalence ratio as shown by curve 1004 in FIG. 10.

In accordance with a preferred embodiment of the present invention, the sensor response may be used to determine the fuel-air ratio and provide good fuel-air control in both fuel rich and lean conditions. Referring to FIG. 10, the actual fuel-air ratio can be determined from the magnitude of the oxygen sensor signal and the sign of the derivative of the oxygen signal versus the blower signal. A negative derivative indicates that the burner is operating in the fuel rich region while a positive derivative indicates that the burner is operating in the fuel lean or oxygen rich region. Thus, as the percentage of oxygen ($O_2\%$) in the exhaust increases in conjunction with an increasing blower signal, the burner is operating in a fuel lean region while as the oxygen level ($O_2$ signal) decreases in conjunction with an increasing blower signal, the burner is operating in a fuel rich region.

The fuel-air controller 910 (shown in FIG. 9) adjusts the speed of the blower 912, faster or slower, depending on which region the burner 906 is operating in, so that the optimal fuel-air ratio is achieved.

Figure 11:
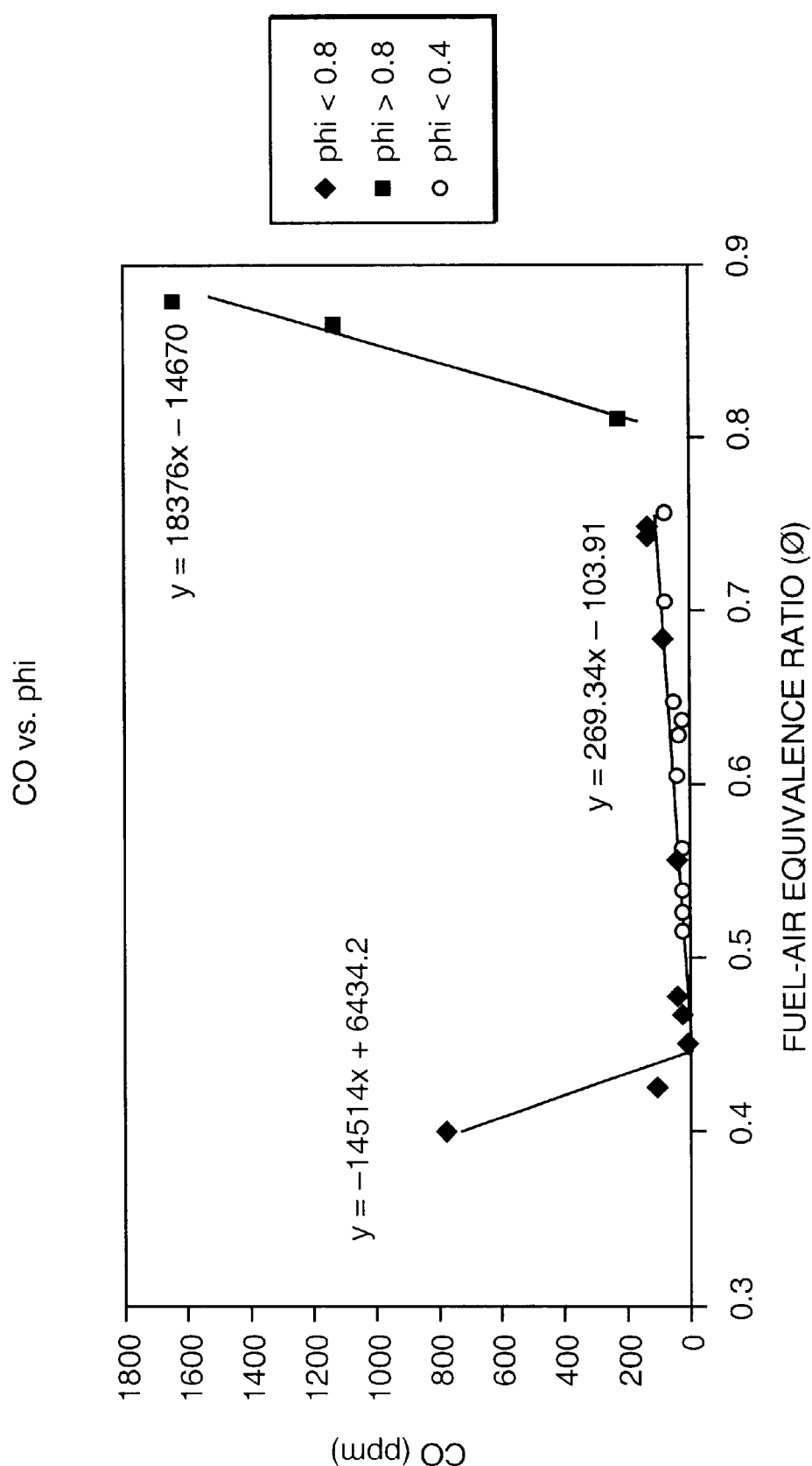
FIG. 11 shows the relationship of exhaust carbon monoxide to the fuel-air equivalence ratio in accordance with an embodiment of the invention.

In an alternative embodiment, the fuel-air ratio may be based on a measurement of the carbon monoxide (CO) content in the exhaust of the Stirling engine using a carbon monoxide sensor as the gas sensor 902 (shown in FIG. 9). CO sensors are advantageous for reasons of cost. The fuel-air ratio can be expressed in terms of the CO exhaust signal in a piece-wise linear fashion as shown in FIG. 11. FIG. 11 shows the fuel-air equivalence ratio versus the CO exhaust signal. The relationship is non-monotonic, meaning that for a given CO value or Co sensor signal, there are two possible fuel-air ratio values. As described above, the fuel-air equivalence ratio may be determined from the magnitude of the CO sensor signal and the derivative of CO signal versus the blower signal. Referring to FIG. 9, the controller 910 uses the blower signal 908 and the CO signal 904 from the CO sensor 902 to determine the current fuel-air ratio, compare it to the desired (or optimal) fuel-air ratio and drive the blower 912 to create the desired (or optimal) fuel-air ratio.

The controller 910 may use a number of strategies to control the fuel-air ratio based on a CO sensor. In one embodiment, the controller 910 adjusts the speed of blower 912, faster or slower, to produce the desired (or optimal) fuel-air ratio. In an alternative embodiment, the controller 910 may vary the blower speed to minimize the CO signal. Optimal control algorithms used to seek a minimal signal are well known in the art. In a further embodiment, the controller 910 may control the fuel and air delivered to the burner to hold the CO signal below a predetermined amount. The fuel-air ratio would be allowed to fluctuate as long as the CO level remained below the desired level.

The systems and methods described herein apply for all gaseous fuels, including but not limited to, propane, natural gas, methane, butane, liquefied petroleum gas (LPG), producer gas, wood-gas and vaporized liquid fuels such as methanol and ethanol. The systems and methods described herein may be applied in other applications besides the Stirling engine in terms of which the invention has been described. The described embodiments of the invention are intended to be merely exemplary and numerous variations and modifications will be apparent to those skilled in the art. All such variations and modifications are intended to be within the scope of the present invention as defined in the appended claims.

We claim:

1. A method for controlling the fuel-air ratio of a burner of an external combustion engine having a heater head, the burner having a blower responsive to a blower drive signal for injecting air into the burner, the method based at least on the concentration of a gas in an exhaust gas product of a combustion chamber of the burner, the method comprising:

measuring the gas concentration in the exhaust gas product;

deriving a gas concentration signal from the measured gas concentration;

determining the fuel-air ratio from the gas concentration signal and the sign of the derivative of the gas concentration signal with respect to the blower drive signal; and controlling the fuel-air ratio by adjusting an air flow rate into the burner.

2. A method according to claim 1, wherein measuring the gas concentration in the exhaust gas product comprises using a gas composition sensor.

3. A method according to claim 2, wherein using a gas composition sensor comprises using at least one of an oxygen sensor and a carbon monoxide sensor.

4. A method according to claim 1, wherein measuring the gas concentration in the exhaust gas product comprises measuring at least one of oxygen and carbon monoxide.

5. A method according to claim 1, wherein the external combustion engine is a Stirling cycle engine.

6. A method according to claim 1, wherein the air flow rate into the burner is adjusted to obtain a predetermined optimal fuel-air ratio.

7. A method according to claim 6, wherein the optimal fuel-air ratio is based at least on a temperature of the air injected into the combustion chamber of the burner by the blower.

8. A method according to claim 7, wherein the temperature of the air is measured using a temperature sensor placed in a path of the air injected into the combustion chamber of the burner by the blower.

9. A method according to claim 7, wherein the temperature of the air is determined based at least on a temperature of the heater head.

10. A method according to claim 3, wherein the gas composition sensor is a carbon monoxide sensor and the air flow rate into the burner is adjusted to minimize the gas concentration signal produced by the carbon monoxide sensor.

11. A method according to claim 3, wherein the gas composition sensor is a carbon monoxide sensor and that air flow rate into the burner is adjusted to obtain a gas concentration signal from the carbon monoxide sensor that is below a predetermined value.

12. A system for controlling the fuel-air ratio of a burner of an external combustion engine having a heater head, based at least on the concentration of a gas in an exhaust gas product of a combustion chamber of the burner, the system comprising:

a sensor for measuring the gas concentration in the exhaust gas product of the combustion chamber and for generating a sensor signal;

a blower, governed by a blower drive signal, for injecting air into the burner; and a controller for receiving the sensor signal from the sensor and for adjusting the blower drive signal based at least on the sensor signal from the sensor and the sign of the derivative of the sensor signal with respect to the blower drive signal, to control the fuel-air ratio in the burner.

13. A system according to claim 12, wherein the sensor is a gas composition sensor.

14. A system according to claim 13, wherein the gas composition sensor is at least one of an oxygen sensor and a carbon monoxide sensor.

15. A system according to claim 12, wherein the sensor measures the gas concentration of at least one of oxygen and carbon monoxide.

16. A system according to claim 12, wherein the external combustion engine includes a Stirling cycle engine.

17. A system according to claim 12, wherein the fuel-air ratio in the burner is controlled to obtain a predetermined optimal fuel-air ratio.

18. A system according to claim 17, wherein the optimal fuel-air ratio is based at least on a temperature of the air injected into the combustion chamber of the burner by the blower.

19. A system according to claim 18, wherein the temperature of the air is measured using a temperature sensor placed in a path of the air injected into the combustion chamber of the burner by the blower.

20. A system according to claim 18, wherein the temperature of the air is determined based at least on a temperature of the heater head.

21. A system according to claim 14, wherein the gas composition sensor is a carbon monoxide sensor and the blower drive signal is adjusted to minimize the sensor signal produced by the carbon monoxide sensor.

22. A system according to claim 14, wherein the gas composition sensor is a carbon monoxide sensor and the blower drive signal is adjusted to obtain a gas concentration signal from the carbon monoxide sensor that is below a predetermined value.

23. A method for controlling the fuel-air ratio of a fuel-air mixture in a burner of an external combustion engine having a heater head, the fuel-air mixture formed from a fuel and preheated air provided to the burner, the method comprising:

determining the fuel-air ratio in the burner;

determining a temperature of the preheated air; and adjusting an air flow rate to obtain a predetermined optimal fuel-air ratio, where the optimal fuel-air ratio is based on at least on the temperature of the preheated air.

24. A method according to claim 23, wherein the temperature of the preheated air is determined using a temperature sensor.

25. A method according to claim 23, wherein the temperature of the preheated air is determined based on at least a temperature of the heater head.

26. A method for igniting a fuel-air mixture in a burner of an external combustion engine, the fuel-air mixture formed from a fuel and air provided to the burner and characterized by a fuel-air ratio, the method comprising:

determining an optimal fuel-air ratio for igniting the fuel-air mixture based on at least the temperature of the air used in the fuel-air mixture;

setting the fuel-air ratio to an initial ignition fuel-air ratio that contains a higher amount of fuel than the optimal fuel-air ratio by adjusting a fuel flow rate into the burner;

maintaining the initial ignition fuel-air ratio until the fuel-air mixture ignites; and reducing the fuel flow rate to obtain the optimal fuel-air ratio.

27. A method for igniting a fuel-air mixture in a burner of an external combustion engine, the burner having a controller and the fuel-air mixture formed from a fuel and air provided to the burner and characterized by a fuel-air ratio, the method comprising:

setting the fuel-air ratio of the fuel-air mixture to an ignition fuel-air ratio that is retrieved from a memory area of the controller of the burner;

attempting to ignite the fuel-air mixture at the ignition fuel-air ratio;

adjusting the fuel air ratio, if the fuel-air mixture does not ignite, by alternately increasing and decreasing the fuel-air ratio above and below the ignition fuel-air ratio until the fuel-air mixture ignites; and storing the fuel-air ratio at which the fuel-air mixture ignites in the memory area as the ignition fuel-air ratio.

28. A method according to claim 27, wherein the fuel-air ratio is adjusted by changing an air flow rate into the burner.

29. A method according to claim 27, wherein the fuel-air ratio is adjusted by changing a fuel flow rate into the burner.

30. A method according to claim 27, further including before each adjustment of the fuel-air ratio, purging the burner of unburned fuel-air mixture.

* * * * *